A. A. WILDER.
Car Starter.
No. 62,303. Patented Feb. 19, 1867.
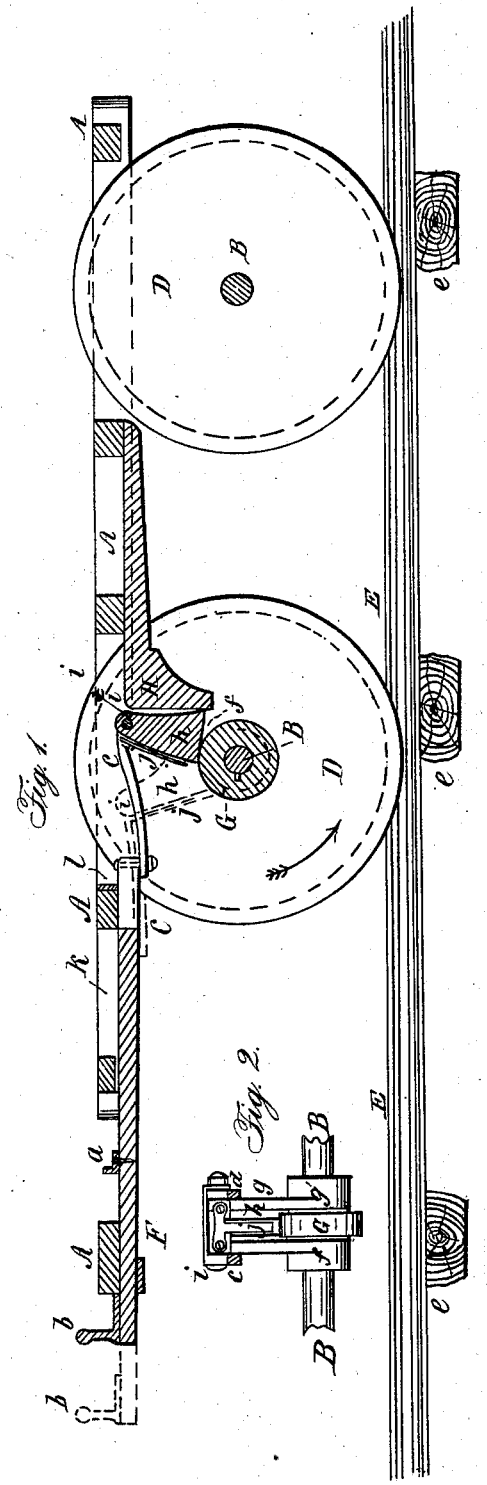
Witnesses:
Theodore Lang
S. S. Fahnestock
Inventor:
A A Wilder

United States Patent Office.

A. A. WILDER, OF DETROIT, MICHIGAN.

Letters Patent No. 62,303, dated February 19, 1867.

IMPROVED RAILROAD CAR-STARTER.

The Schedule referred to in these Letters Patent and making part of the same.

TO ALL WHOM IT MAY CONCERN:

Be it known that I, A. A. WILDER, of the city of Detroit, in the county of Wayne, and State of Michigan, have invented a new and improved Mode of Starting and Propelling Railroad Cars and other vehicles; and I do hereby declare that the following is a full and exact description thereof, reference being had to the accompanying drawing, making a part of this specification, in which like parts are indicated by like letters in the several figures.

The nature of my invention consists in the application to any ordinary street or other railroad car, or other vehicle, of a simple device, (to be hereafter described,) whereby the inertia of the same may be much more easily overcome, the object being to save wear and tear or waste and loss of stock, where animal power is used, and of machinery where such propulsion is used.

To enable others skilled in the art to make and use my invention, I will proceed to describe its construction and operation.

It is a well-known fact that the greatest strain, on horses or machinery, is in starting a mass, or overcoming its inertia, and this is particularly demonstrated on street railroads (the cars) drawn by horses, and where there are such frequent stoppages; the loss of stock by such racking or straining of teams, under the circumstances, being almost incredible. In the drawings—

Figure 1 represents a vertical longitudinal and central section through the truck or under frame of a railroad car, (in this case having but four wheels,) showing the construction and application of my improvement to the same.

Figure 2 is a partial elevation of my said improvement.

A represents any ordinary framework of the truck or frame by which a car is supported on its axles, B, and wheels, D. E is an ordinary rail, resting on cross-ties, e. F is a draw-bar, to which the horses may be attached in any ordinary manner. a is a stop, securely attached to this draw-bar, to limit its forward movement when the horses (to illustrate) are attached to the same or its forward pin, b. This draw-bar is secured to two links, c and d, and these in turn are attached to two arms, f and g, having sleeves, f' and g', embracing the axle B, (and slipping on it.) Between these arms is an eccentric-dog, h. The said dog, links, and arms are joined by the same pin i. On the axle B, between the arms f and g, is a wheel, G, secured to the axle B in any suitable way. In front of the dog h there is a spring, j, pressing it back, the said dog in its normal position resting against a stop, H, secured to truck frame. This stop is of much importance in this connection, inasmuch as when the dog strikes it in falling back, the dog is thrown out of contact with the wheel G. The lower curved surface of the dog h, where it bears upon the wheel G, is not described from the centre of the pin i, on which it rotates, but said surface is eccentric to said pin, very slightly so, just enough to give a good bearing on G when the dog is pulled forward, as seen in red lines, where it is evident the dog, and the wheel it bears on, constitute a lever to move the axle and its car wheels. Herein is the advantage of my improvement in starting the car. When the dog is in its backward position, its lower surface is just clear of wheel G. k represents a spring attached to draw-bar at the stop a, and to one of the cross-pieces of truck or frame at l; the object of the said spring being to bring the draw-bar and dog back when the pulling strain on the former is relieved. This spring may be any other kind of one performing the same function.

In ordinary cases, the attachment to a car is made, say at the front cross-piece A of frame. Suppose the horses are found unable to move the load. Were my attachment on the car and the horses pulled on it, as is intended, no such difficulty could be found to exist; but with my improvement one horse is found to be equal to two and three pulling as they ordinarily do, or, in other words, a pair of horses pulling on my improved device, can start a load three times heavier with the same case, or the same load with one-third of the strain required by the ordinary attachment. Should the stop a come in contact with the front bar A, the draught will be of the ordinary kind. My device is intended to be applied to each end of a car.

I am aware of the patent of A. F. French, dated August 1, 1865, wherein an axle is turned by means of a toothed wheel and a common pointed dog, the several parts being constructed and arranged differently from mine. Such I do not claim; but, having thus described my invention, what I claim as new, and desire to secure by Letters Patent of the United States, is—

1. In a device for starting cars, the eccentric-dog $h$, wheel G, arms $f$ and $g$, spring $j$, links $c$ and $d$, in combination with axle B, when constructed, arranged, and operating in the manner substantially as shown and described and for the purpose set forth.

2. In a device for starting cars, the combination of the eccentric-dog $h$ and stop H, when operating in the manner substantially as shown and described and for the purpose set forth.

A. A. WILDER.

Witnesses:
S. S. FAHNESTOCK,
JOHN S. HOLLINGSHEAD.